Figure 1:
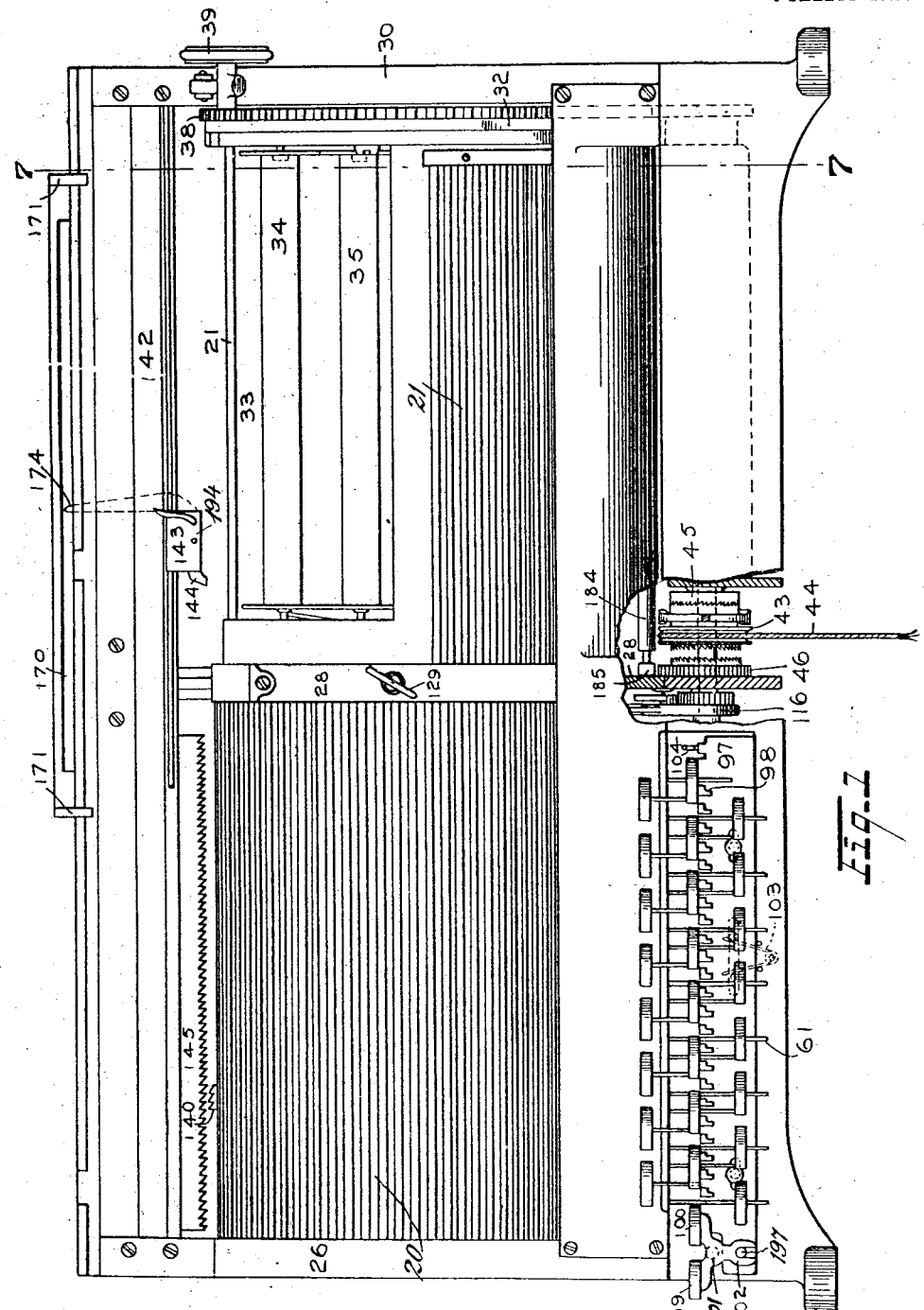

H. C. GAMMETER.
DUPLICATING MACHINE.
APPLICATION FILED FEB. 2, 1907.

1,053,091.

Patented Feb. 11, 1913.

6 SHEETS—SHEET 3.

WITNESSES:
Brennan B. West
Nathan F. Fretter

INVENTOR,
Harry C. Gammeter.
BY Baker, Jones & Hull,
ATTYS.

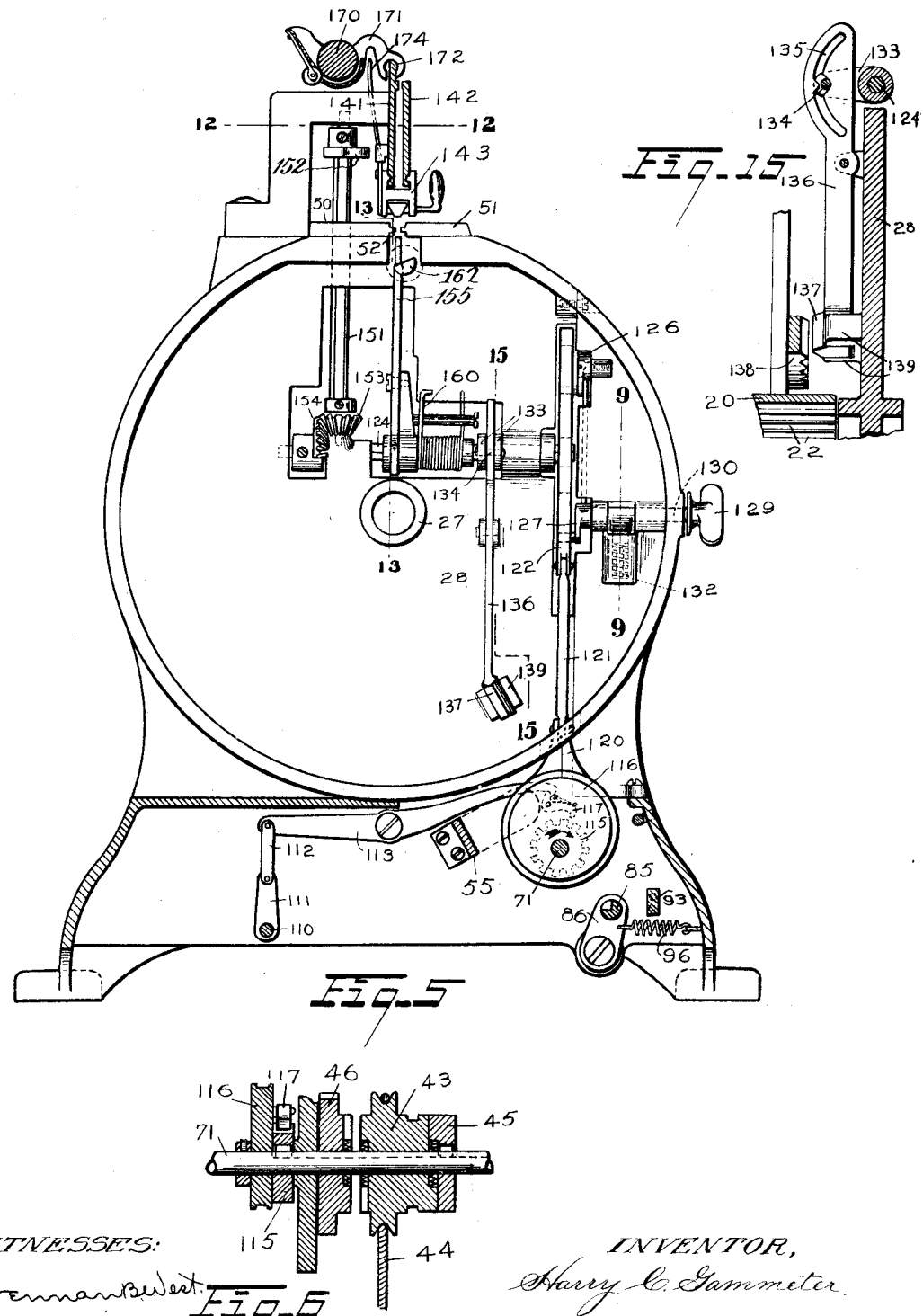

H. C. GAMMETER.
DUPLICATING MACHINE.
APPLICATION FILED FEB. 2, 1907.
1,053,091.
Patented Feb. 11, 1913.
6 SHEETS—SHEET 6.
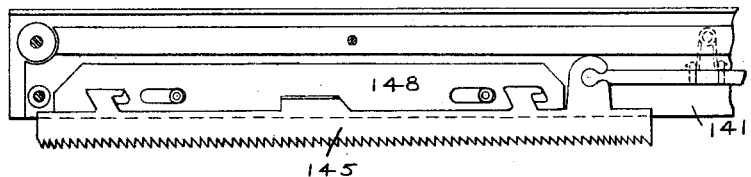
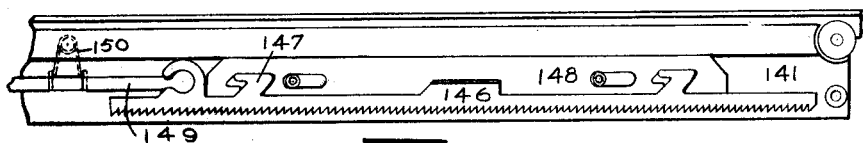
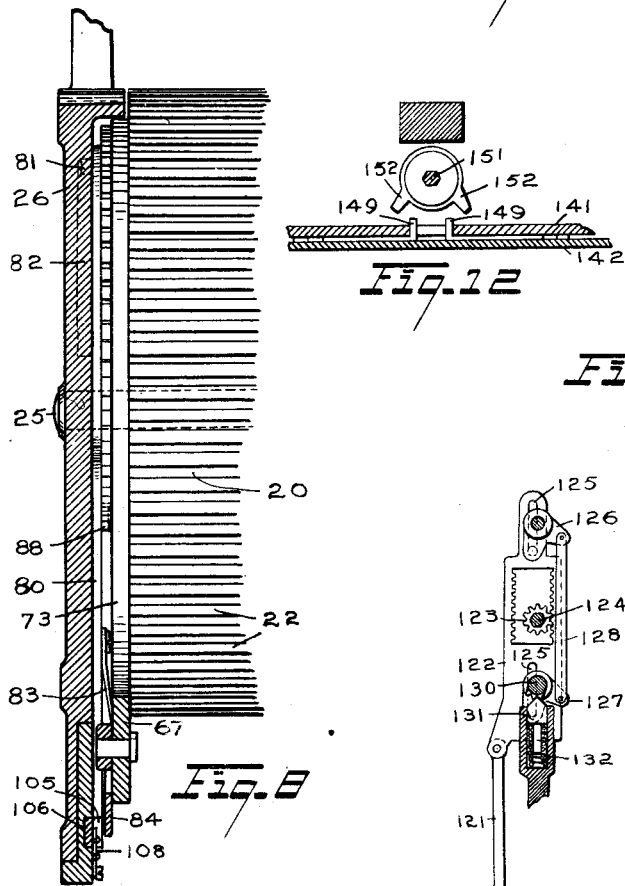
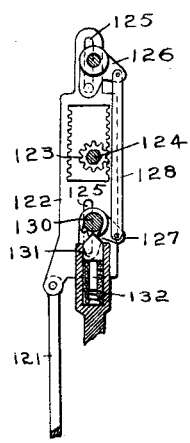
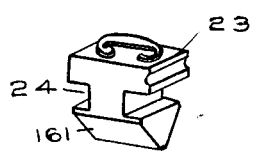
WITNESSES:
INVENTOR,
Harry C. Gammeter,
BY Bates, Fouts & Hull, ATTYS.

UNITED STATES PATENT OFFICE.

HARRY C. GAMMETER, OF CLEVELAND, OHIO, ASSIGNOR TO THE AMERICAN MULTI-GRAPH COMPANY, OF CLEVELAND, OHIO, A CORPORATION OF OHIO.

DUPLICATING-MACHINE.

1,053,091.  Specification of Letters Patent.  Patented Feb. 11, 1913.

Application filed February 2, 1907. Serial No. 355,456.

*To all whom it may concern:*

Be it known that I, HARRY C. GAMMETER, a citizen of the United States, residing at Cleveland, in the county of Cuyahoga and State of Ohio, have invented a certain new and useful Improvement in Duplicating-Machines, of which the following is a full, clear, and exact description, reference being had to the accompanying drawings.

This invention relates to duplicating machines of the class commercially known as the multigraph, wherein there is a printing couple, individual type, and mechanism for assembling the type and for distributing it after use. Such a machine is illustrated in my prior Patents Nos. 722,404 and 816,311, issued March 10, 1903, and March 27, 1906, respectively. There the type are normally carried by a movable storage member which is moved by hand, bringing the proper line thereof into transfer position, and then the manual operation of suitable mechanism causes the transfer of type from the storage member to enable it to pass to the printing couple; a substantially reverse movement distributes the type from the printing couple to the storage member.

One of the objects of the present invention is to lessen the error which may result from the direct manual positioning of the storage member.

Another object is to relieve the operator from as much manual labor as possible, enabling him instead to apply and control power mechanism.

The present invention therefore comprehends the combination with a printing couple of a keyboard having keys corresponding with the various characters and arranged to control the assemblage and distribution of the type.

The invention includes also mechanism whereby the operation of the keys applies power to move the type-selecting mechanism, the subsequent operation of type transfer following automatically.

The invention also includes mechanism whereby the same source of power may operate, as desired, both the assemblage and distribution mechanism and the printing mechanism.

Other features of the invention will appear in the following description and the claims.

The machine which I have produced in carrying out this invention is illustrated herein in a preferred form, wherein the printing couple comprises two coöperative rotary members. The storage member may be a rotary member placed end to end with the printing member. A suitable driving member is provided, which may be caused to rotate either the storage member to bring it to proper position, such rotation being controlled by the finger keys, or may be caused to rotate the printing drum to cause the printing. Moreover, in setting or distributing, when the storage member has been positioned, the same power may be caused to effect the transfer of the type, this operation following automatically upon the positioning of the storage member.

While the above is the preferred form of my invention, I do not intend to limit myself thereto, as I believe myself to be the first inventor of the broad idea of a combined printing mechanism and a keyboard-controlled type setting and distributing mechanism coöperating therewith, as well as of other features herein illustrated.

Figure 2:
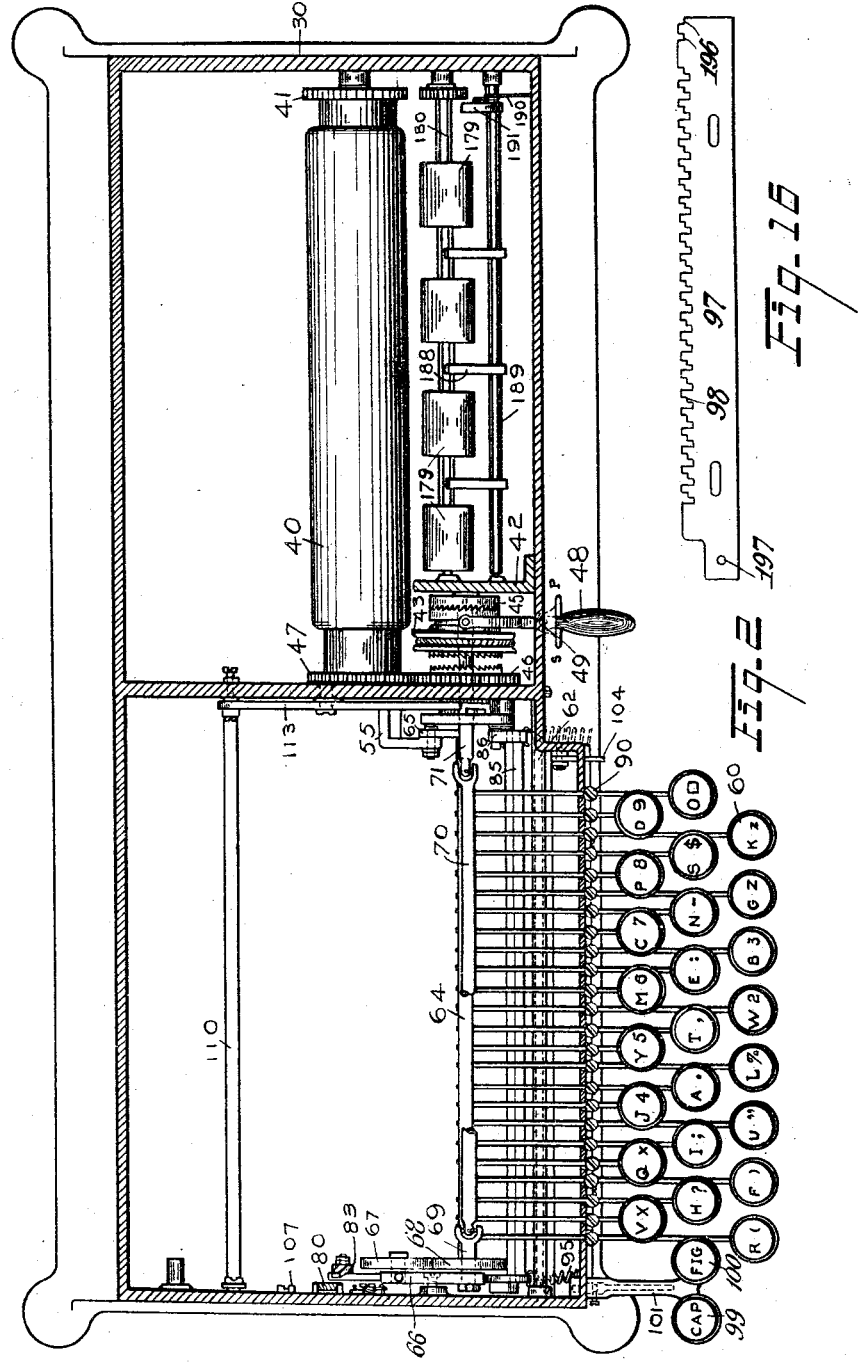
Figure 3:
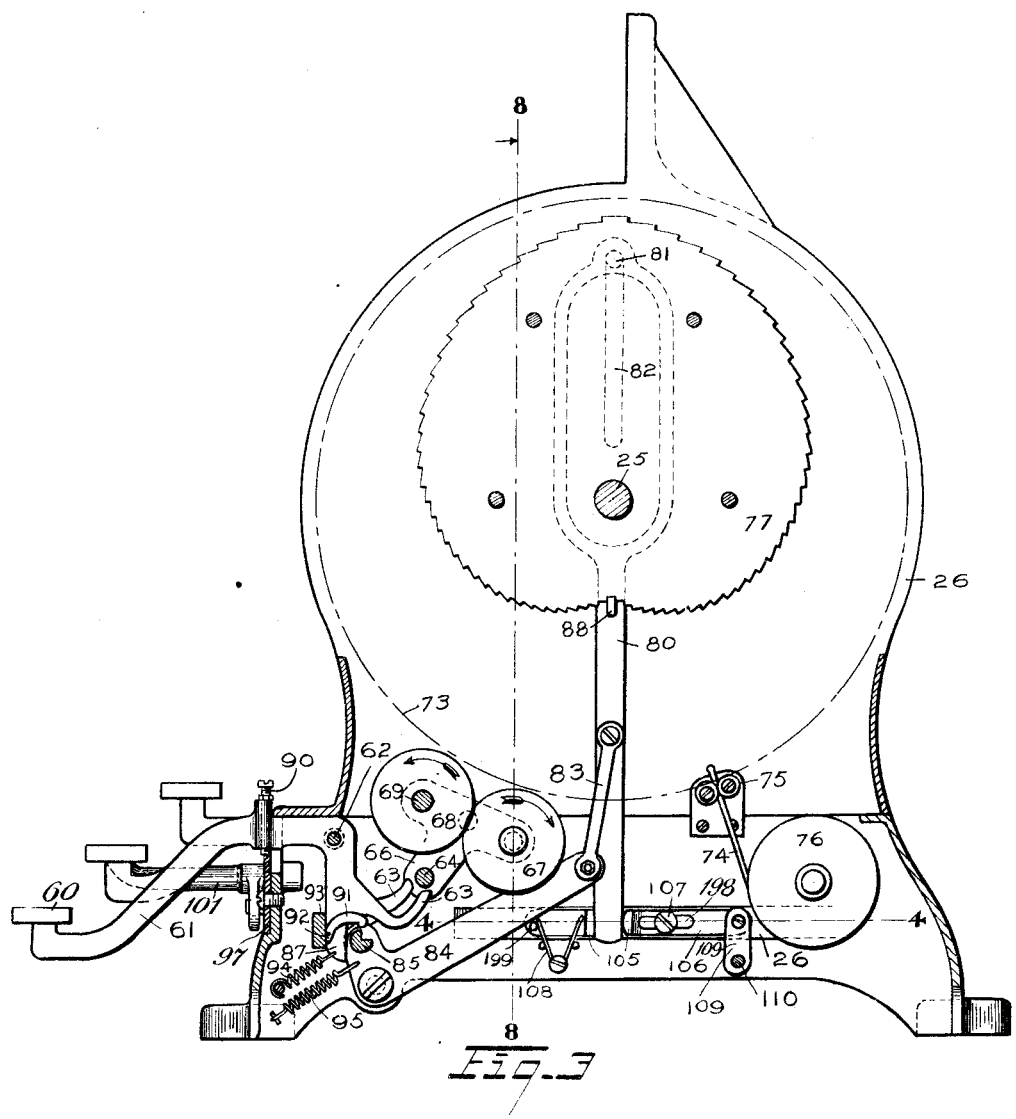
Figure 4:
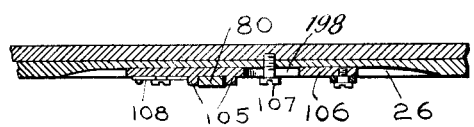
Figure 7:
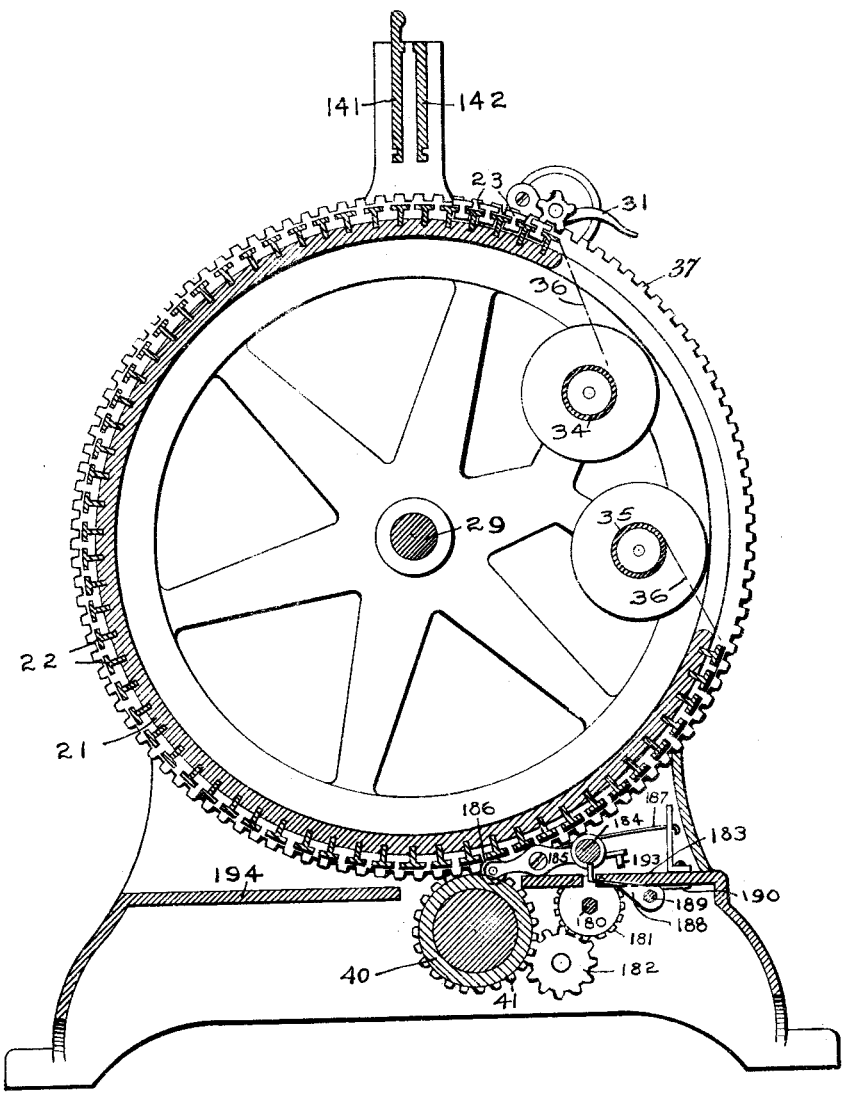

In the drawings, Figure 1 is a front elevation of a preferred embodiment of my machine, being partly broken away to show the power-controlling clutch. Fig. 2 is a horizontal section of such machine taken just below the storage drum and printing drum. Fig. 3 is a vertical section taken at the left of the storage drum and looking toward the left frame plate. Fig. 4 is a detail, being a horizontal section on the line 4—4 of Fig. 3. Fig. 5 is a vertical section through the machine at the right hand end of the storage drum looking toward the center frame plate. Fig. 6 is a vertical section through the power controlling clutches. Fig. 7 is a vertical section through the printing drum, looking toward the right frame plate. Fig. 8 is a vertical section substantially on the line 8—8 of Fig. 3, being in a plane parallel with Fig. 1, and showing the construction adjacent to the left hand end of the storage drum. Fig. 9 is a detail, being a vertical section substantially on the line 9—9 of Fig. 5 and illustrating a portion of the transfer mechanism. Figs. 10 and 11 are elevations respectively of the left hand and right hand combs which feed the lines of type to the transfer position. Fig. 12 is a detail showing the immediate means for operating the combs, being a horizontal cross section on the line 12—12 of Fig. 5. Fig. 13 is a detail illustrating the mechanism for preventing over-setting, being a vertical section substantially on the line 13—13 of Fig. 5, looking toward the front of the machine. Fig. 14 is a perspective view of one of the type. Fig. 15 is a detail in vertical section on the line 15—15 of Fig. 5. Fig. 16 is a front view of the stop bar for the key levers.

I will now describe the embodiment shown in the drawings, premising that many features thereof, not necessitating keyboard control, are covered not only in the patents referred to, and others, but in various pending applications of mine, for example, the mechanism for transferring the type from one drum to the other; the mechanism for preventing over-setting during the transfer; the rock shaft mechanism for operating these parts; the mechanism for holding the printing drum in position, and the copy holder and indicator are claimed in my applications Serial Nos. 297,447, 236,463 and 298,121; the type employed, in Patent No. 836,026, and the paper feeding mechanism in Patent No. 846,992.

Referring to the parts by reference numerals, the supply drum, as a whole, is designated 20, and the printing drum 21. These are arranged so that type ordinarily stored on the supply drum may be transferred, as desired, to the printing drum, a convenient arrangement being to have the drums of the same diameter and placed end to end with their axes in alinement. Each drum has a series of similar longitudinal type holders which may be channels constricted at their outer edges to overhang the type and hold them in place. As shown, these channels are provided by rails 22 which may be carried by spiders or set into the surface of a cylindrical member. The type are shown in Fig. 14 at 23. They have grooves 24 adapted to be occupied by the edges of the rails and thereby held in place.

The storage member is mounted on a shaft 25 (Fig. 3) which is journaled in the left hand end frame standard 26 and in a bushing 27 in the intermediate frame standard 28. The printing drum is mounted on a shaft 29 which is journaled in the central bushing 27 and in the right hand frame standard 30. These drums are arranged to be rotated by mechanism to be hereinafter described and forming a portion of the present invention, the supply drum being rotated to bring the proper channel into position for transfer of the type from one drum to the other, and the printing drum after assemblage of the type being rotated to cause the printing.

The printing drum is shown as having a recess 33 in which are mounted a pair of spools 34, 35, which carry an inking-ribbon 36, which is passed around the drum after the type are assembled thereon, this ribbon moving with the drum during the rotation to enable the type to print. Suitable mechanism, such, for example, as shown in my Patent No. 816,311 referred to, may be employed to feed the ribbon periodically with each rotation of the drum to present a new face to the type.

The printing drum coöperates with a rotary under-running impression platen 40 which is geared with the drum by means of a gear 37 on the drum meshing with a pinion 41 connected with the platen. This platen may be carried in adjustable bearings, not shown, but illustrated in my Patent No. 816,311 referred to.

On the upper edge of the central frame standard 28 are a pair of blocks 50 and 51 which are formed at their opposed faces with ribs corresponding to the grooves 24 in the type, whereby these blocks provide a transfer channel from one drum to the other. During transfer of type the printing drum is held with the desired channel in alinement with the transfer channel 52 by reason of the engagement with the gear 37 on the drum of a pinion 38, which is rigidly connected with a hand wheel 39, with which a detent (not shown) engages, preventing accidental displacement, the pinion, hand-wheel and detent being mounted in a movable lever 31 held in place by a spring (not shown). This arrangement, which is shown and claimed in one of my prior applications, furnishes means for rotating the printing drum, step by step to bring the desired channel into position for transfer, and means also for holding it in such position during the transfer. When it is desired, however, this device is turned back out of the way.

The keyboard which controls the positioning of the supply drum and the transfer of type is preferably located on the front side of the machine at the left hand half,—the mechanism directly actuated by the keys, being beneath the supply drum. The keys are designated 60 and the key levers 61. These levers are all mounted on a common shaft 62 which extends from the frame member 26 to the frame member 28. The levers extend below this shaft and then rearward, each lever having a tail designated 63, the tails of two adjacent key levers being shown in Fig. 3. The tails of the various levers are adjacent to a rod 64 carried at the right hand end by a link 65 pivoted to a bracket 55 and at the left hand by a three-arm lever 66. This lever carries a stud on which is journaled a roller 67 which has its periphery in frictional engagement with another roller 68. This roller 68 is rigid with the short shaft 69 journaled in the lever 66 and connected by a universal joint with the rod 70, which at its other end has a universal joint connection with the main driving shaft. 71 This main driving shaft during the assembling or distributing is continuously driven, as hereinafter described. Formed around the periphery of the storage drum adjacent to the left hand end thereof is a smooth surface, indicated by the broken line 73 in Fig. 3, and fully in Fig. 8. Now if the rod 64 be swung upwardly about the pivots of the links 65 and the lever 66, the wheel 68 will be brought into engagement with the smooth surface 73, thereby causing the drum to rotate in the opposite direction from the rotation of the wheel 68. If, on the other hand, the rod 64 be swung downwardly, the wheel 67 will be brought into engagement with the smooth surface 73 which will drive the storage member in the opposite direction from that which it has when the wheel 68 engages. The wheels 67 and 68 have yielding peripheries to insure a good frictional engagement with the surface 73 and with each other.

It will be seen from the above description that a simple swinging of the rod 64 upward or downward will cause the power to drive the storage member in one direction or the other. This shifting is caused by the tails 63 of the key levers, half of the key levers having tails adapted to engage beneath the rod 64 and raise it, and the other half having tails adapted to strike on the front side of the rod and thereby lower it.

It is to be understood that the tails 63 of the key levers are so formed that they give the proper movement to the rod 64, irrespective of the amount of movement of the key lever. After these tails have engaged the rod, and moved it the slight distance necessary, the tails slide idly beyond the rod,—the soft surfaces of the wheels 67 and 68 allowing some variation without interfering with the operation.

A suitable strap 74 is connected at its upper end with the storage member and passes between a pair of guide sheaves 75 and is connected at its lower end with a spring barrel 76 (Fig. 3). This spring barrel thus tends to bring the drum back to normal position. When a lever is depressed the drum is rotated in the corresponding direction as above described, and when the pressure is taken off the key, the spring barrel brings the drum back to normal position.

To stop the storage drum at exactly the right point corresponding to the key depressed, I provide the heart shaped toothed member 77 which is secured to the storage member and rotates with it about its axis. This heart shaped member is in effect made of two sections of an arithmetical spiral. The surface of this spiral is composed of steps, the rise of each of which is a definite arbitrary amount, and the tread of which is an arc or chord of the same angular distance. Mounted between the heart shaped member and the end frame plate 26 is a pendulum 80, which yokes loosely around the shaft 25, and at its upper end carries a pin 81 occupying a vertical slot 82 in the end frame plate. This pendulum is connected by a link 83 with the bell crank lever 84, the short arm of which carries one end of a universal bar or rod 85 which extends parallel with the rod 62 and is mounted at its other end in an arm 86 secured to the central frame member. Each key lever extends downward in front of the universal bar or rod 85, as shown at 87, and this portion of the key lever is adapted to engage the front side of said rod whenever a key is depressed and shove the rod rearward, thereby swinging the long arm of the bell crank downward, and drawing down the pendulum. This pendulum carries a lug 88 adapted to engage a step or tooth of the heart member according to the position of the pendulum,— the lug thus forming a stop for the rotation of the storage drum. To control the rotation and stopping of the drum, it is accordingly only necessary to regulate the depression of the key levers so that the rod 85 will be swung rearward and the lug 88 thereby drawn downward the proper distance to cause the lug to engage the proper step on the heart member. To allow this varying throw to the key levers they are provided with downward projections of varying amount, as for example, by set screws 90, which engage a suitable stop bar 97. These screws are shown as passing through the key levers so that their lower ends project beyond the same and are capable of adjustment to allow different movement for the different keys; they are to be taken as an illustration of any system of varying projections carried by the key levers.

To prevent momentum throwing the bell crank 84 too far, each key lever may be provided with a latch 91, normally held idle by reason of its tail 92 engaging a stationary bar 93, but adapted to engage the universal bar or rod 85 as soon as the rod is engaged by the key lever. Suitable springs 94 are provided for elevating the various key levers, as well as springs 95 and 96 for drawing forwardly the bell crank 84 and link 86 respectively.

The stop bar 97 with which the set screws or stops 90 of the key levers engage, may be shiftable to allow each key to control a plurality of type channels. The bar is so shown in Figs. 1 and 16 wherein it is designated 97. It is slidably mounted on the front side of the machine and has a stepped notch 98 for each key lever. Each notch preferably has three surfaces, as shown in Fig. 16, which the set screw on the key lever may engage, whereby each key may control three channels according to whether the bar is in either extreme position or in intermediate position, and these three channels contain three different characters of type corresponding to the indication on the keys,— for example, a lower case letter, the corresponding upper case letter, and a numeral. Thus, the number of keys in the keyboard are kept within convenient limits.

To shift the bar 97, I provide the keys 99 and 100, which are mounted on a common rocking stem 101, which carries a depending fork 102 adapted to engage a pin 197 carried by the bar 97. A suitable spring 103 furnishes means for maintaining this bar normally in its mid-position, the depression of the key 99 shifting the bar in one direction and the key 100, in another direction. As shown, each key normally coöperates with a channel carrying type of a lower case character, and the corresponding upper case letters and the numerals occupy channels on each side of this one, respectively. The shifting in one direction of the bar 97, (as, for example, toward the right in Fig. 1,) causes the key to take a deeper impression to present the corresponding upper case character, while the shifting in the other direction reduces the movement of the key and accordingly controls numerals, punctuation, etc. In the drawings there are shown but twenty four keys, in which case two of the letters, as X and Z, have both their upper and lower case letter keys in the position usually occupied by numerals or punctuation points, and the type of these letters have possession of the corresponding channels in the drum, as will be understood. A small arm 104 is adapted to engage either of a pair of notches 196 on the bar 97 and lock it in either extreme position whenever desired.

It is desirable to bring the storage drum to rest gradually and also to have the drum just as it comes to rest actuate mechanism to cause the transfer of type to or from this drum. This I accomplish by means of the pendulum 80. The lower end of this pendulum lies between a pair of lugs 105, which are carried on a bar 106 slidably mounted in a groove in the end frame member 26. A pin 107 operating through a slot 198 in this bar provides a stop for its movement. A spring 108 mounted on the frame member lying between a pair of pins thereon and bearing against a lug 105 and a pin 199 on the bar 106 provides the necessary buffer to bring the drum gently to rest. As the step on the heart member engages the lug 88, as the drum is coming into its final position, the lug and pendulum are thereby swung in the direction the engaging step of the heart member is moving,— the lower end of the pendulum thereby shifting the bar 106 in one direction or another, compressing the spring 108, the drum coming gently to a positive stop when either end of the slot 198 in the bar engages the screw 107, which blocks any further movement of the pendulum.

When the actuation of a key has caused the drum to rotate and just as it is coming to a definite stop as above set out, the movement of the bar 106 throws into actuation the type transferring mechanism. This is accomplished by the following mechanism: Journaled in the end frame member 26 and the intermediate frame member 28 is the rock shaft 110 which has at one end a rock arm 109 connected with the bar 106. At the other end is a rock arm 111 connected by a link 112 with a lever 113. This lever controls a clutch adapted to connect the power with the type transferring mechanism.

As shown in Figs. 5 and 6, rigid with the continuously rotating shaft 71 is a notched disk 115 lying alongside of an eccentric 116 which is loose on the shaft. This eccentric carries a pawl 117 which is normally out of engagement with the notched disk. When, however, the pendulum operates to rock the rod 110, the lever 113 which normally engages the pawl 117 is withdrawn from the pawl and a spring acting on that pawl forces it into engagement with the continuously rotating notched disk. Thereupon the eccentric begins to rotate. Surrounding this eccentric is an eccentric strap 120 which is connected by a link 121 with a toothed yoke 122, Fig. 9. This yoke surrounds a pinion 123 on a rock shaft 124, which, as hereinafter described, operates to shove the line of type in either drum toward the other a distance equal to the thickness of a type, according to the direction of the rocking of the shaft, after the manner set out in my application No. 298,121, filed January 27, 1906. This will be hereinafter described.

To enable the yoke 122 to cause the actuation of the rock shaft 124 in either direction to set or distribute as desired, I provide a switch mechanism as follows: The yoke is guided by slots 125 therein, which are occupied by pins on a pair of bell cranks 126 and 127. These two bell cranks are connected by a link 128 so that they operate in unison. The bell crank 127 is rigidly mounted on a short rock shaft 130, on the forward end of which is a knob or button 129. A suitable plunger 131 is adapted to engage either of two notches in a collar carried rigidly with the shaft 130 and prevent accidental displacement of said shaft—a spring 132 acting on this plunger. When the parts are in the position shown in Fig. 9, the eccentric is adapted to actuate the transfer mechanism for distributing. To change the setting, it is only necessary to give the button 129 a slight turn, thereby rocking the bell cranks 127 and 126 and by means of them shifting the yoke over to the right so that its other row of teeth engage with the other side of the pinion 123. This enables the eccentric to rock the shaft 124 in the reverse manner, causing the assemblage of the type.

It will be seen from the above description that as soon as the storage drum comes to rest under the control of an actuated finger key, the eccentric is clutched to the driving shaft and the shaft 124 rocked in one direction or the other to operate the transfer mechanism. The first movement of the shaft 124, by reason of the arms 133 (see Fig. 15) which have a pin 134 engaging the cam slot 135 in the lever 136, is to swing the lower end of that lever to the left, causing its beveled nose 137 to enter into a beveled notch in a ring 138 carried on the interior of the supply drum near its left hand end,—there being one notch for each type channel. This operation accurately positions the supply drum and locks it, the lever 136 being prevented from displacement by the stationary guiding lugs 139 (Figs. 2 and 15). Following this locking, the transfer of the type takes place. After the eccentric has begun its movement and before its rotation is completed, pressure of the operator's finger on the key is released. The pendulum and lever 113 then come to normal position, the nose of the lever being adapted to engage the tail of the pawl 117 just as the eccentric completes its rotation. After the type has been transferred and when the shaft 124 is returning to normal position the lever 136 is thereby reversely actuated to release the storage drum, which has been locked by the nose 37, and the spring barrel 76 operates to return the drum to normal position. If the same character is desired in succession, the key is simply held down and the eccentric continues to rotate, transferring as many type as desired. Any suitable interlock (not shown) may be provided to prevent a key being depressed until its predecessor has returned to normal position.

I have shown mechanism operated by the rock shaft 124 for feeding the type from either drum toward the other, which is substantially that shown in my application No. 298,121, and claimed therein, and covered also by several other pending applications of mine. This transfer mechanism is shown in Fig. 5, and Figs. 10 to 13 inclusive. It is to be understood that at the left hand end of each line of characters in the supply drum is a follower 140 having teeth on its upper edge, as shown in Fig 1. Above the printing drum and guided to slide along the lower portion of the longitudinal frame plates 141 and 142, is a follower block 143 carrying a pawl 144 adapted to engage at the right hand end of the row of type in the printing drum which is in the highest position.

145 and 146 represent a pair of combs carried respectively above the storage drum and the printing drum between the frame members 141 and 142. Comb 145 appears in Fig. 1. Comb 146 stands normally entirely behind the frame bar 142 and hence does not show in this figure. These combs have inclined lugs 147 engaging in corresponding recesses in bars 148 which are guided to move longitudinally of the frame members 141 and 142. Suitable friction is provided to retard these bars. A pair of links 149 are connected with the inner ends of the combs and have their ends turned rearwardly through a slot in the frame member 141. A spring 150 acting on these rear ends tends to keep the combs in normal position.

151 represents a vertical rock shaft having at its upper end a head with a pair of projecting lugs 152. This rock shaft carries at its lower end a beveled pinion 153 which meshes with a partial beveled pinion 154 on the rock shaft 124.

The result of the above described mechanism is that when the rock shaft 124 is turned in one direction or the other, one or the other lug 152 is moved into engagement with the end of the corresponding link 149, and this moves the corresponding comb 145 or 146 toward the transfer channel 52 between the drums. In this movement the comb first moves diagonally downward into engagement with the follower 140 directly beneath it, or the follower block 143, as the case may be. After such engagement the continued pull on the link 149 pulls both the comb and the bar 148 longitudinally, thus advancing the whole line of type in the line to enter such channel.

The normal feed of the type line under the influence of one comb or the other is equal to the thickness of a single type, the type bodies being all of the same thickness. In order to prevent oversetting by momentum, I have devised a limiting finger which engages the type in the transfer channel and positively prevents it advancing more than the desired distance. This finger is shown in Figs. 5 and 13. It is designated 155. Its upper end normally stands just beneath the channel 52, its lower end forks around the hub 156 of an arm 157 carried by the rock shaft 124. Carried by this arm 157 is a roller 158 occupying a slot 159 in the arm 160

155. This slot extends from its mid position diagonally downward in two directions, thus having a V-shape, and then extends from the end of each arm outwardly in a curve which is approximately an arc about the axis of the rock shaft. A suitable spring 160 tends to hold the finger in mid position.

When the rock shaft 124 is rocked, the roller 158 operates to raise the finger, thus projecting it into the type channel 52. The lower portions of the sides of the type are beveled as shown at 161 in Fig. 14, so that the finger may easily pass between consecutive type. A suitable notched stop member 162 carried by the intermediate frame member 28 provides a pair of shoulders 163 and 164 on opposite sides of the finger, limiting the movement of the finger in one direction or the other parallel with the type channel 52. The movement allowed to the finger by this stop 162 is just equal to the thickness of a type. The result is that on the first movement of the rock shaft 124, the finger is projected into the path of the type, then while the corresponding comb is acting on the type, the roller 158 is moving in the now concentric slot 159, holding the finger in position, while the line of type is advanced,— the advancement being thus positively limited to the thickness of one type and oversetting by momentum being prevented.

From the above description, it will be seen that in assembling it is only necessary to set the button 129 in the proper position, set and lock the printing drum (by means of the pawl 38 and hand wheel 39) with the proper channel to receive the type in alinement with the transfer channel 52, and to depress the finger keys corresponding to the various characters desired,—the positioning of the supply drum and the transferrence of the type therefrom, first into the transfer channel and eventually into the printing drum, following automatically. For distributing, the button 129 is set in its opposite position, and each finger key is depressed corresponding to the character about to be transferred to the storage member. It is thus desirable to have a suitable indicator showing the character of that type which is in such position. For this purpose, I may employ the indicator shown in my application No. 298,121, referred to, and claimed there and elsewhere. As shown in that application, there is a copy holder, shown herein in Figs. 1 and 5. This copy holder comprises a roller 170 mounted on the pair of arms 171 which are formed to slidably engage a bead 172, along the upper edge of the longitudinal frame member 141,—the copy holder being shiftable along such frame member. The follower block 143 carries a pointer 174 adapted to coöperate with copy on the copy holder.

Now after the printing has been effected and it is desired to distribute the type, a copy of the matter printed is placed in the copy holder and the copy is adjusted so that the pointer indicates the character which is in position to be transferred to the storage member. If the transfer from the printing drum were directly to the supply drum, the copy holder would be so positioned that its pointer would originally point to the letter corresponding to the first character in the type line. As, however, several of the type are contained in the transfer channel 52 during distribution, the copy holder is so positioned that the pointer is a corresponding number of characters behind the one corresponding to the type at the end of the printing drum. Thus the pointer will always indicate the proper position for the supply drum, and, in distributing, it is only necessary, after setting the printing drum and adjusting the copy holder to depress the keys corresponding to the characters successively indicated by the pointer on the copy holder. This copy holder is also of use in assembling, as it is adapted to carry a copy of the matter to be assembled, and being properly adjusted, the pointer indicates to the operator which key should be next depressed to assemble the proper matter.

I have heretofore described the mechanism for the positioning of the supply drum and the transfer of the type as operated from the power derived from the continuously rotating drive shaft 71. While this shaft is continuously rotated during the operations of assembling and distributing, it is idle during the printing operation, and the same power which drives the shaft 71 may also be utilized to drive the printing drum and the impression platen,—there being a suitable clutch to control the connection of the source of power. This clutch and the mechanism for driving the printing drum and impression platen will now be described.

The shaft 71 is mounted in the frame member 28, and the bracket 42 Fig. 2. Loosely mounted on this shaft is a sheave 43 which constitutes the main driving member, this sheave being connected with a suitable source of power, as illustrated by the belt 44. This sheave is provided on its opposite sides with clutch teeth. When the sheave is in its right hand position, as shown in Figs. 1 and 2, it is clutched with a collar 45 rigid with the shaft 71 whereby the power drives this shaft. This is the position for setting or distributing.

For printing, the sheave 43 is clutched with teeth carried by a gear 46 mounted on the frame member 28 and engaging a gear 47 on the impression platen,—the impression platen being connected at its other end with the printing drum by reason of the gears 41 and 37. It follows that when the sheave 43 is in its left hand position, the power rotates the impression platen and printing drum to effect the printing. A suitable shipper lever 48 is provided to shift the driving member 43 as desired. This shipper lever is shown in Fig. 2 as pivoted to the frame at 49 and its handle is shifted to the left to effect the setting and distributing, as indicated by the letter "S", or toward the right to effect the printing, as indicated by the letter "P".

During the printing the paper is fed automatically to the impression platen and printing drum by mechanism which is shown and claimed in my pending application No. 225,154, filed September 19, 1904. This mechanism will now be described.

Mounted between the end frame member 30 and the intermediate member 28 is a shaft 180 which carries a pinion 181 meshing with an idler 182 which meshes with the gear 41 on the platen. On this shaft 180 are rollers 179 extending through openings in the feed table 183. Above these rollers and normally out of engagement therewith is a roller 184, carried in arms 185 pivotally mounted on the frame members 30 and 28. The arm 185 which is mounted on the frame member 30 (being the only one shown) extends rearwardly of its pivot and carries a roller 186 adapted to be engaged by a cam 32 mounted on the printing drum. This cam normally engages the roller 186 and thereby holds the roller 184 out of engagement with the rollers 179 which are continuously rotated during printing.

At the proper time to feed the paper, a depression in the cam 32 allows the spring 187 to force the roller 184 downward onto the paper, gripping it between that roller and the rolls 179, and causing the paper to be fed rearwardly until engaged by the impression platen and the printing member.

To form a positive stop, insuring the accurate presentation of the paper to the feeding mechanism, I provide the fingers 188 mounted on a rock shaft 189 and having upturned ends adapted to extend through openings in the feed table 183. This rock shaft 189 is provided with a spring 190 adapted to maintain the fingers normally in this position, so that their upturned ends stop the paper. The rock shaft 189 has an arm 191 which extends beneath a downturned portion 193 of the arm 185 which is mounted on the frame member 30. Accordingly when the cam allows the forward end of this arm 185 to swing downward, the projection 193 acting on the arm 191, rocks the shaft 189 and swings the fingers 188 downward to clear the table, freeing the paper just as it is gripped between the roller 184 and the rolls 179.

It is to be understood that each sheet of paper is advanced manually or by suitable mechanism, not shown, into position with its forward edge against the upturned edge of the fingers 188, just after the preceding sheet has been moved out of the way by the feeding action of the printing drum and impression platen.

It will be seen from the foregoing description that I have provided an automatic power-operated and key-board-controlled combined typesetting, distributing and printing machine. In assembling, the printing drum is properly positioned and held by the detent pinion 38; the copy to be printed is placed in the copy holder and the same is adjusted so that the pointer on the follower block, when the latter is shifted to the extreme left, will correspond to the latter to be set. The button 129 is set for assemblage and the shipper lever 48 is set to clutch the power mechanism to the drive shaft 71. Then it is only necessary to operate the finger keys to cause the assemblage of a line of type. After the line is assembled the printing member is turned by the hand wheel 39 to bring a new channel into engagement with the transfer channel and the copy holder roller 170 is correspondingly turned and the follower block 143 repositioned at the extreme left. In this manner, the page of matter is assembled on the printing drum. When the printing is to be done, the lever 31 carrying the hand wheel 39 and its pinion are turned back out of the way, one of the ribbon spools 34 or 35 is removed and the drum given a rotation to wrap the ribbon around the type matter on the drum, the spool being then replaced. The pawl 144 on the follower 143 is tipped up into idle position (by means of an arm 194 secured to the pivot of the pawl), the shipper lever is then set for printing, so that the drum, platen and paper feed mechanism is continuously driven. The paper being supplied on the paper table in the proper position is thus automatically printed and fed out in finished form on the ejection table 194. After the printing is completed, the power mechanism is released from the impression platen and printing drum and clutched with the drive shaft of the setting and transfer mechanism. The ribbon spool is removed and the drum given a rotation and the spool replaced, the type being thus uncovered. The drum is positioned with its first channel opposite the transfer channel and is there locked by the detent pinion 38. A sheet of the matter printed is placed in the copy holder and the copy holder and follower are adjusted so that the pointer indicates the proper character for distribution. The button 129 is set in the direction to distribute. Then the finger keys are successively operated, as indicated by the pointer, until the line is distributed, and then a new line is brought into position by the hand wheel 39 and is distributed, and so on, until the whole page has been returned to the storage member.

I claim:—

1. The combination of a printing couple, a key board with keys corresponding to various characters, mechanism controlled by the key board for assembling individual type on one member of the couple, and means for causing one member of the couple to roll upon the other while in printing contact therewith, whereby the printing is effected by rolling action.

2. The combination with a platen, of a printing member adapted to turn on an axis and adapted to carry lines of individual type concentrically with the axis and coöperate with the platen to print while turning, a key board with keys corresponding to the various characters of type, and mechanism controlled by the key board for assembling such type on said member in a series of lines concentric with the axis of the member.

3. The combination with a printing couple, of power-operated and key-controlled mechanism for assembling individual type on one member of the couple, and means for causing one member of the couple to roll upon the other while in printing contact therewith, whereby the printing is effected by rolling action.

4. The combination with a platen and a coöperating printing member adapted to turn on an axis while printing of power-operated and key-controlled mechanism for assembling individual type from an external source on such member in a series of lines concentric with said axis.

5. The combination in a unitary machine, of a printing couple, a type magazine, mechanism for assembling type from the magazine onto the couple, a key board, power mechanism controlled by the key board and adapted to effect the assemblage, and mechanism adapted to be driven by the same source of power for operating the printing couple.

6. The combination of a rotary printing drum, mechanism for assembling individual type thereon, a key board, power mechanism controlled by the key board and adapted to effect the assemblage, and mechanism adapted to be driven by the same source of power for rotating the printing drum.

7. The combination of a printing couple which prints by rolling contact, mechanism for assembling individual type on one member of the couple, and power mechanism adapted to cause the operation of the couple or of the assemblage mechanism, as desired.

8. The combination of a printing couple, one member of which is rotary, a type magazine, mechanism for assembling individual type from the magazine on one member of the couple, and power mechanism adapted to cause the rotation of one member of the couple to print and adapted to operate the assemblage mechanism, as desired.

9. The combination of a rotary printing drum, a rotary impression platen, means for driving such members to print, mechanism for assembling individual type on the printing drum, power mechanism adapted to drive the assemblage mechanism, and a key board having characters corresponding to the different characters of type and adapted to control the assemblage mechanism.

10. The combination in a unitary machine of a rotary printing drum, a rotary impression platen, means for concurrently rotating such members to print, mechanism for assembling individual type on the printing drum, power mechanism adapted to drive either the assemblage mechanism or the printing members, a clutch for determining which is driven, and a key board having characters corresponding to the different characters of type and adapted to control the assemblage mechanism.

11. The combination of a printing couple, a key board with keys corresponding to various characters, and mechanism controlled by the key board for distributing type from one member of the couple.

12. The combination of a rotary printing drum adapted to carry type, a key board with keys corresponding to the various characters of such type, and mechanism controlled by the key board for distributing type from the drum.

13. The combination with a printing couple, of power-operated and key-controlled mechanism for distributing type from one member of the couple.

14. The combination with a printing member adapted to turn on an axis, of power-operated and key-controlled mechanism for distributing type from such member.

15. The combination in a unitary machine, of a printing couple, mechanism for distributing type therefrom, a key board, power mechanism controlled by the key board and adapted to effect the distribution, and mechanism adapted to be driven by the same source of power for operating the printing couple.

16. The combination of a rotary printing drum, mechanism for distributing type therefrom, a key board, power mechanism controlled by the key board and adapted to effect the distribution, and mechanism adapted to be driven by the same source of power for rotating said drum.

17. The combination of a printing couple, mechanism for distributing type from one member of the couple, and power mechanism adapted to cause the operation of the couple or of the distributing mechanism, as desired.

18. The combination of a printing couple, one member of which is rotary, mechanism for distributing type from one member of the couple, and power mechanism adapted to cause the rotation of one member of the couple and adapted to operate the distributing mechanism, as desired.

19. The combination of a rotary printing drum, a rotary impression platen, means for driving such members to print, mechanism for distributing individual type from the printing drum, power mechanism adapted to drive the distributing mechanism, and a key board having characters corresponding to the different characters of type and adapted to control the distributing mechanism.

20. The combination of a rotary printing drum, a rotary impression platen, means for driving such members to print, mechanism for distributing individual type from the printing drum, power mechanism adapted to drive the printing members or the distributing mechanism as desired, and a key board having characters corresponding to the different characters of type and adapted to control the distributing mechanism.

21. The combination of a printing couple, a key board with keys corresponding to various characters, and mechanism controlled by the same key board for both assembling type on and distributing type from, one member of the couple.

22. The combination of a rotary printing drum, type adapted to be carried thereby, a key board with keys corresponding to various type characters, and mechanism controlled by the same key board for both assembling type on and distributing type from said drum.

23. The combination with a printing couple, of power-operated mechanism for assembling type on and distributing type from one member of the couple, and finger keys corresponding to the various type characters and operating to control said mechanism.

24. The combination with a rotary printing drum, of power-operated and key-controlled mechanism for assembling type on and distributing type from said drum.

25. The combination in a unitary machine, of a printing couple, mechanism for assembling and distributing type thereon, a key board, power mechanism controlled by the key board and adapted to effect the assemblage and distribution, and mechanism adapted to be driven by the same source of power for. operating the printing couple.

26. The combination of a rotary printing drum, mechanism for assembling and distributing type thereon, a key board, power mechanism controlled by the key board and adapted to effect the assemblage and distribution, and mechanism adapted to be driven by the same source of power for rotating the printing drum.

27. The combination of a printing couple, mechanism for assembling and distributing type on one member of the couple, and power mechanism adapted to cause the operation of the couple and adapted to operate the assembling and distributing mechanism, as desired.

28. The combination of a printing couple, one member of which is rotary, means for assembling and distributing type on one member of the couple, mechanism adapted to cause the rotation of one member of the couple, mechanism adapted to operate the assembling and distributing means, and a single-power means for driving both of said mechanism, as desired.

29. The combination of a rotary printing drum, a rotary impression platen, means for driving such members to print, mechanism for assembling and distributing individual type on the printing drum, power mechanism adapted to drive the assemblage and distributing mechanism, and a key board having characters corresponding to the different characters of type and adapted to control the assemblage and distributing mechanism.

30. The combination in a unitary machine of a rotary printing drum, a rotary impression platen, means for driving such members to print, mechanism for assembling and distributing individual type on the printing drum, power mechanism adapted to drive the printing members and the assemblage and distributing mechanism, a clutch for determining which is driven, and a key board having characters corresponding to the different characters of type and adapted to control the assemblage and distributing mechanism.

31. The combination of a printing couple, a key board with keys corresponding to various characters, mechanism controlled by the key board for assembling type on and distributing type from one member of the couple, and shiftable means to connect the mechanism for setting or distributing, as desired.

32. The combination of a printing member adapted to turn on an axis during printing, a key board with keys corresponding to various characters, mechanism controlled by the key board for assembling type on and distributing type from said member, and shiftable means to connect the mechanism for setting or distributing, as desired.

33. The combination with a printing couple, of power-operated and key-controlled mechanism for assembling type on and distributing type from one member of the couple, and shiftable means to connect the mechanism for setting or distributing as desired.

34. The combination with a printing member adapted to turn on an axis while printing, power-operated and key-controlled mechanism for assembling type on and distributing type from such member, and shiftable means to connect the mechanism for setting or distributing, as desired.

35. The combination in a unitary machine, of a printing couple, mechanism for assembling and distributing type thereon, a key board, shiftable means to connect the mechanism mentioned for setting or distributing, as desired, power mechanism controlled by the key board and adapted to effect the assemblage and distribution, and mechanism adapted to be driven by the same source of power for operating the printing couple.

36. The combination of a rotary printing drum, a font of individual type, mechanism for assembling and distributing the type to or from the drum, a key board having keys corresponding to the various type characters, shiftable means to connect said mechanism for setting or distributing, as desired, power mechanism controlled by said key board and adapted to effect the assemblage and distribution, and mechanism adapted to be driven by the same source of power for rotating the printing drum.

37. The combination of a printing couple, mechanism for assembling and distributing type on one member of the couple, shiftable means to connect said mechanism for setting or distributing as desired, and power mechanism adapted to cause the operation of the couple or of the assembling and distributing mechanism, as desired.

38. The combination of a printing couple, one member of which is a rotary printing drum, mechanism for assembling and distributing type on said drum, shiftable means to connect said mechanism for setting or distributing as desired, and power mechanism adapted to cause the rotation of said drum and adapted to operate the assembling and distributing mechanism, as desired.

39. The combination in a unitary machine of a rotary printing drum, a rotary impression platen, means for driving such members to print, mechanism for assembling and distributing individual type from the printing drum, shiftable means to connect the mechanism for setting or distributing as desired, power mechanism adapted to drive the assemblage and distributing mechanism, and a key board having characters corresponding to the different characters of type and adapted to control the assemblage and distributing mechanism.

40. The combination in a unitary machine of a rotary printing drum, a rotary impression platen, a rotary paper-feeding device, means for rotating such members to print, mechanism for assembling and distributing individual type on the printing drum, shiftable means to connect the mechanism for either setting or distributing, as desired, power mechanism, a clutch for determining which is driven, and a key board having characters corresponding to the different characters of type and adapted to control the assemblage and distributing mechanism.

41. The combination, with means for holding parallel lines of type, of a keyboard having keys corresponding to various characters, and mechanism controlled by said keyboard for assembling and distributing type thereto and therefrom, and means for inking said type in said holder and printing therefrom.

42. The combination, with means for holding parallel lines of type, of a key board having keys corresponding to various characters of the type, mechanism controlled by the key board for both assembling and distributing the type and an inking ribbon and a platen coöperating with type in said holder.

43. The combination of a platen, a rotary typeholder member coöperating therewith and formed to carry parallel lines of type, mechanism for assembling type thereon and distributing it therefrom, a keyboard whose keys correspond to the characters of the type, power mechanism adapted to effect the assemblage and distribution, and connecting mechanism between the keyboard and the power mechanism.

44. The combination of a type storage member and a transfer channel, movable one with reference to the other, a set of finger keys adapted to control such movement, to present different characters to the transfer channel, a font of individual type, and mechanism controlled by the finger keys for moving said type from the storage member to the transfer channel.

45. The combination of a movable type storage member, mechanism for moving it, a transfer channel, a set of finger keys adapted to control the movements of said member, to present different characters to the transfer channel, a font of individual type, and mechanism controlled by the finger keys for moving said type from the storage member to the transfer channel.

46. The combination of a printing couple, a type storage member, mechanism for effecting the transfer of type from the storage member to the printing couple, and from the printing couple to the storage member, and a key board adapted to control said transfer mechanism, and having keys corresponding to the various characters of the type.

47. The combination of a type storage member and a transfer channel, movable one with reference to the other, a set of finger keys adapted to control such movement, power mechanism adapted to actually effect such movement, to present different characters to the transfer channel, a font of individual type, and mechanism controlled by the finger keys for moving said type from the storage member to the transfer channel.

48. The combination of a movable storage member, a transfer channel, power mechanism adapted to actually move said member, a set of finger keys adapted to control the movements of said member, to present different characters to the transfer channel, a font of individual type, and mechanism controlled by the finger keys for moving said type from the storage member to the transfer channel.

49. The combination, with a printing couple, of a storage member movable as a unit and having a series of permanently parallel row-holders, a font of individual type carried thereby and arranged in rows of different characters, the characters in any row being the same, mechanism for positioning the storage member, mechanism for transferring type from it to one member of the printing couple, and a key board control for such positioning mechanism.

50. The combination with a printing couple, one member of which is formed to carry rows of individual type, of a movable storage member, a font of individual type carried thereby arranged in rows, a number of type of a single character to a row, mechanism for positioning the storage member, mechanism for transferring type to it from said member of the printing couple, and a key board control for such positioning mechanism.

51. The combination of a movable storage member having type holders, mechanism for positioning said member, mechanism for feeding type in a properly positioned holder of the storage member, a key board having keys corresponding to the different type characters, and mechanism governed by the keys for controlling the positioning mechanism, the type feeding mechanism being automatically operated consequent upon the operation of the positioning mechanism.

52. The combination of a movable type storage member, a key board having keys corresponding to the different type characters, power mechanism controlled by the keys for moving the storage member, mechanism operated by the keys for controlling the position of said member, and mechanism for feeding the type automatically operated consequent upon the storage member coming to position.

53. The combination of a printing couple, a channeled type storage member, mechanism for selecting the proper channel of the type storage member, mechanism for transferring type in such channel to the printing mechanism, automatic means for operating said last mentioned mechanism, and finger keys for controlling said selecting means.

54. The combination of a rotary storage drum having type holders corresponding to the different characters of type, mechanism for rotating it, finger mechanism for controlling such rotating mechanism, and automatic mechanism for feeding type in the storage member.

55. The combination with a type holder, mechanism for distributing type therefrom, an indicator comprising means for holding a copy of the type matter and a coöperating member, one of which is moved according to the movement of the type being distributed, and a key board having characters corresponding to the type and adapted to control such distribution.

56. The combination with a printing couple, mechanism for distributing type from one member thereof, an indicator comprising means for holding a copy of the type matter and a coöperating member, one of which is moved according to the movement of the type being distributed, and a key board having characters corresponding to the type and adapted to control such distribution.

57. The combination with a printing couple, mechanism for distributing type therefrom, an indicator comprising means for holding a copy of the type matter and a coöperating member, one of which is moved according to the movement of the type being distributed, a key board having characters corresponding to the type, and power mechanism controlled by such key board and adapted to operate the distributing mechanism.

58. The combination of a printing couple, a type storage member, mechanism for transferring type from either of such devices to the other, power mechanism, and a clutch adapted to connect it with such transferring mechanism.

59. The combination of two type holding devices, mechanism for transferring type from either of such devices to the other, power mechanism, a clutch adapted to connect it with such transferring mechanism, and a shiftable member adapted to operate on a portion of the mechanism between the power and the type to determine whether the mechanism is to assemble or distribute.

60. The combination in a unitary machine, of a rotary printing drum, a type storage drum, said drums being mounted end to end, mechanism for positioning the storage drum, and finger keys corresponding to the different characters for controlling such mechanism.

61. The combination of a type storage drum, a printing drum mounted end to end, mechanism for positioning the storage drum, a key board having finger keys for controlling such mechanism, and automatic mechanism for transferring type from one drum to the other.

62. The combination of a movable type storage member, frictional driving mechanism adapted to move it in either direction, and key actuated mechanism for controlling such frictional drive.

63. The combination of a movable type carrying member, two friction wheels, power mechanism for rotating them in opposite directions, and key controlled mechanism for bringing either wheel into engagement with a part movable with the type carrying member.

64. The combination of a type carrying member adapted to turn on an axis, a pair of friction wheels, mechanism for rotating them in opposite directions and key controlled mechanism for bringing either wheel into engagement with a part movable with the type carrying member.

65. The combination of a rotary storage member having a smooth peripheral bearing surface, a friction wheel mounted adjacent thereto, means for rotating it, a key board, and mechanism operated thereby for moving said wheel into engagement with said peripheral surface.

66. The combination of a rotary storage member having a smooth peripheral bearing surface, a continuously rotating friction wheel mounted adjacent thereto, a key board, mechanism operated thereby for moving said wheel into engagement with said peripheral surface, and mechanism operated by the key board for stopping the rotation of the storage member.

67. The combination of a rotatable storage member formed to removably hold individual type, a spring device tending to center it but allowing it to turn in either direction, finger keys, mechanism controlled thereby for turning the member in one direction or the other as desired, and means for moving the type relative to the member.

68. The combination of a rotatable storage member, a spring device tending to center it but allowing it to turn in either direction, finger keys, power mechanism controlled thereby for turning the member in one direction or the other as desired, and mechanism actuated by the keys for stopping such rotation.

69. The combination of a rotatable type carrying drum, power mechanism, finger keys, mechanism operated by the finger keys to connect the power mechanism with the drum to drive the same, mechanism to stop the rotation of the drum at desired points, and suitable connecting mechanism between such stopping mechanism and the keys, enabling the drum to be stopped at various points according to the key actuated.

70. The combination of a storage member adapted to be turned on an axis, a stepped spiral carried thereby, a movable stop member, mechanism for driving the storage member, and key actuated mechanism for positioning the stop member to engage with one of the steps of the spiral according to the key actuated.

71. The combination of a rotary type storage drum, a stepped spiral carried thereby at one end, a pendulum having a shoulder adapted to engage said spiral, means for positioning said pendulum according to the character desired, and means for rotating the drum until it is stopped by a step on the spiral engaging said shoulder.

72. The combination of a movable type storage member, power mechanism for moving the same in either direction, mechanism for stopping the movement, a key board, and mechanism operated thereby for positioning the stopping mechanism.

73. The combination of a movable type storage member, mechanism for moving it, mechanism for stopping the movement, mechanism for feeding type to or from the member, said type feeding mechanism being actuated by the stopping mechanism.

74. The combination of a movable type storage member, power mechanism for moving the same, mechanism for stopping the movement, a key board, mechanism operated thereby for positioning the stopping mechanism, and mechanism automatically initiated by the stopping mechanism for feeding the type in the storage member.

75. The combination of a rotary type storage member, frictional driving mechanism adapted to rotate it in one direction or the other, key actuated mechanism for controlling such frictional drive, key controlled mechanism for stopping said drum at the desired point, and type feeding mechanism operated by such stopping mechanism.

76. The combination of a movable storage member, a stepped member carried thereby, a movable stop member, mechanism for driving the storage member, key actuated mechanism for positioning the stop member to engage with one of the steps of the stepped member according to the key actuated, and mechanism for feeding the type in storage member, said mechanism being initiated by movement communicated to said stop member by the storage member.

77. The combination of a storage member adapted to be turned on an axis, a stepped spiral carried thereby, a movable stop member, mechanism for driving storage member, key actuated mechanism for positioning the stop member to engage with one of the steps of the spiral according to the key actuated, and mechanism for feeding the type in the storage member, said mechanism being controlled by said stop member.

78. The combination of a rotatable storage drum, a heart-shaped stepped member on one end thereof, a pendulum having a shoulder adapted to be engaged by one of such steps according to the position of the pendulum, a key board having finger keys corresponding to the different characters of type, said keys operating to position the pendulum, said pendulum having a limited movement after engagement by the heart member, and type feeding mechanism initiated by said limited movement.

79. The combination of a rotary storage drum, a stepped heart-shaped member on the end thereof, a pendulum at the end of the drum having a shoulder adapted to engage any of the steps of said member, a key board, mechanism actuated thereby for positioning the pendulum according to the key operated, means for rotating the drum until stopped by engagement of a step with the shoulder of the pendulum, said engagement giving the pendulum a limited movement, and type feeding mechanism actuated by such movement.

80. The combination of a rotary type drum, a rotary storage drum, a stepped heart-shaped member on the end thereof, a pendulum at the end of the storage drum having a shoulder adapted to engage any of the steps of said member, a key board, mechanism actuated thereby for positioning the pendulum according to the key operated, means for rotating the storage drum until stopped by the engagement of a step with the shoulder of the pendulum, said engagement giving the pendulum a limited movement, driving mechanism, an eccentric normally loose, a clutch which the movement of the pendulum is adapted to actuate to connect the eccentric with the driving mechanism, an eccentric strap mounted on the eccentric, and type transferring mechanism operated by said eccentric strap.

81. The combination of a type storage drum, a printing drum, mounted end to end, an impression platen coöperating with the printing drum, paper feeding mechanism, mechanism for conjointly driving the printing drum, the impression platen and paper feeding mechanism, a driving shaft for assembling or distributing, a main driver adapted to be engaged either with said driving mechanism or said driving shaft, an eccentric loosely connected with the driving shaft, type transferring mechanism adapted to be operated by the eccentric, a clutch for controlling said eccentric, mechanism operated by the driving shaft for rotating the storage drum, a key board, mechanism positioned by the keys for stopping the rotation of the drum, and means whereby said stopping mechanism operates said clutch.

82. The combination of two type holding devices, mechanism for causing transfer of type from either device to the other, a shiftable driving mechanism for actuating said transfer mechanism, a driving shaft having an eccentric adapted to operate said transfer mechanism, a clutch for controlling said eccentric, and means for operating said clutch.

83. The combination of a rotary printing drum and a rotary type storage member mounted end to end, mechanism extending partly parallel with the drums and partly between them for causing transfer of type from either drum to the other, a shiftable driving mechanism carried between the drums for actuating said transfer mechanism, a driving shaft having an eccentric adapted to operate said transfer mechanism, a clutch for controlling said eccentric, and means for operating said clutch.

84. The combination of a rotary type carrying member, a rotary impression platen, paper feeding mechanism, a rotary driving member adapted to drive the type carrying member, the impression platen and the paper feed mechanism, a movable type storage member, means whereby the same rotary driving member may move the type storage member, and mechanism for transferring type from the storage member, when properly positioned, to the type carrying member.

85. The combination of a rotary type carrying drum, a rotary impression platen, paper feeding mechanism, a rotary driving member adapted to drive the printing drum, the impression platen and the paper feed mechanism, a rotary type storage member, means whereby the same rotary driving member may rotate the type storage member, a clutch for determining such rotations, and mechanism for transferring type from the storage member, when properly positioned, to the printing drum.

86. The combination of a rotary type carrying drum, a rotary impression platen, paper feeding mechanism, a rotary driving member adapted to drive the printing drum, the impression platen and the paper feed mechanism, a rotary type storage member, means whereby the same rotary driving member may rotate the type storage member, mechanism for transferring type from the storage member, when properly positioned, to the printing drum, said last mentioned mechanism being automatically operated by said rotary driving member, and finger keys for controlling the rotation of the storage member.

87. The combination in a unitary machine, of a printing couple, a type storage member movable as a unit and adapted to hold a font of individual type, a key board, mechanism controlled thereby for turning the type storage member in either direction, and for stopping it as desired, and automatic mechanism for transferring type between the positioned storage member and one member of the printing couple.

88. The combination of a printing couple, a storage member, a type channel between them, a font of individual type arranged in rows of the different characters in the storage member, means for relatively positioning the storage member and type channel, and a key board for controlling said means.

89. The combination of a printing couple, a storage member, a type channel between them, a font of individual type arranged in rows of the different characters in the storage member, means for relatively positioning the storage member and type channel, a key board for controlling said means, and power mechanism controlled by said key board for causing such movement.

90. The combination of a type storage member adapted to carry individual type, power mechanism for moving it, and finger actuated mechanism for controlling such movement and for shifting the type.

91. The combination of a type storage member, frictional power mechanism for moving it, finger actuated mechanism for causing the application of such power, and finger actuated mechanism for stopping the movement while the power is applied.

92. The combination in a unitary machine, of a printing couple, a type storage member, mechanism for transferring selected type from the storage member to the printing couple, and a key board having finger keys corresponding to the different characters of the type and adapted to control the selection and transfer.

93. The combination in a unitary machine, of a printing couple adapted to carry lines of individual type and print by rolling motion, and key-board-controlled and power-operated mechanism for assembling or distributing the type thereon.

94. The combination in a unitary machine, of a printing couple adapted to carry lines of individual type and print by rolling motion, mechanism for assembling type thereon and distributing it therefrom, and a key board having keys corresponding to the various characters of the type and adapted to control the assemblage and distribution.

95. The combination with type grooved in its opposite sides and adapted to be held by parallel rails, of mechanism for both assembling and distributing such type, and a single keyboard having keys corresponding to the various characters of the type and adapted to control both the assemblage and distribution.

96. The combination in a unitary machine, of a printing couple, adapted to carry a page form of individual type and print by rolling co-action of the form and platen, a type storage member, type adapted to be carried thereby, a key board and mechanism controlled thereby and adapted to cause the selection of type and its transference to the printing couple.

97. The combination in a unitary machine, of a rotary printing couple, mechanism for assembling and distributing type thereon, and a common power device for both the printing couple and the setting and distributing mechanism.

98. The combination of a printing couple, adapted to carry individual type and print by rolling motion, a type storage member, type adapted to be carried thereby, mechanism adapted to cause the selection of type and its transference to the printing couple, and a common driver for operating both said couple and said mechanism.

99. The combination in a unitary machine, of a printing couple, one member of which has rotary movement during printing and one member of which is adapted to carry individual type assembled in a page form, mechanism for causing such assemblage and the distribution of the type, mechanism for determining whether said mechanism shall assemble or distribute, a set of finger keys for controlling the mechanism first mentioned, a single driver adapted to operate either the mechanism first mentioned or the printing couple, and mechanism for determining which mechanism the single driver shall operate.

100. The combination in a unitary machine, of a font of individual type, a printing couple formed to carry a plurality of parallel rows of such type, and a key board controlled typesetting and distributing mechanism coöperating directly with one member of the couple.

101. The combination in a unitary machine, of printing mechanism, typesetting and distributing mechanism, power mechanism for operating the latter mechanism, and a key board for controlling such power mechanism.

102. The combination in a unitary machine of a printing mechanism, a typesetting and distributing mechanism coöperating therewith, driving mechanism common to the two mechanisms mentioned, and finger keys for controlling the typesetting and distributing.

103. The combination of a movable type holding member having a plurality of typeholders, mechanism for controlling the position of said member, and mechanism for feeding the type automatically from said member operated consequent upon said member coming to position.

104. The combination of a movable storage member having type holders, mechanism for positioning said member, mechanism for feeding type in a properly positioned holder of the storage member, the type feeding mechanism being automatically operated consequent upon the operation of the positioning mechanism.

105. The combination of a channeled type storage member, mechanism for moving the same in either direction to select the proper channel of the type storage member, mechanism for feeding type in such selected channel, automatic means for operating said last mentioned mechanism, and finger keys for controlling said selecting means.

106. The combination of a rotary storage drum having typeholders corresponding to different characters of type, mechanism for rotating it to position, and mechanism for feeding type to or from the drum operated automatically by its coming to position.

107. The combination of a type carrying member, mechanism for bringing it to position, and mechanism for feeding type thereto or therefrom automatically operating consequent upon its coming to position.

108. The combination of a movable type holding member having a series of type rows of respective characters, mechanism for positioning said member including a key board whose keys correspond to the characters of the type, and mechanism for moving the type automatically consequent upon the holder coming to position.

109. The combination of a member formed to hold rows of type each row having type of one character, the characters of the different rows being different, mechanism for selecting a row, and mechanism for moving type in that row automatically consequent upon its selection.

110. The combination of a member formed to hold rows of type movable in the direction of the row, each row being of a different character and the characters in the row being the same, a key board having keys corresponding to the different characters and adapted to select corresponding rows, and mechanism for moving type in the selected row consequent upon its selection.

111. The combination with a printing couple, of a movable storage member, mechanism for positioning the storage member, and mechanism operating automatically consequent upon such positioning for transferring type from it to one member of the printing couple.

112. The combination with a printing couple, of a type storage member movable as a unit and adapted to hold a font of individual type, power mechanism adapted to move said member, finger mechanism adapted to control such movement, and type feeding mechanism operating automatically.

113. The combination in a unitary machine, of a printing couple, a type storage member movable as a unit and adapted to hold a font of individual type, a key board, mechanism controlled thereby for moving the type storage member and for stopping it, and automatic mechanism for transferring type between the positioned storage member and one member of the printing couple.

114. The combination of a movable type holder, mechanism for moving it, mechanism for stopping the movement, mechanism for feeding type along the holder, and a clutch for controlling the type feeding mechanism actuated by the stopping mechanism.

115. The combination of a movable type storage member, power mechanism for moving the same, mechanism for stopping the movement, and mechanism automatically initiated by the stopping mechanism for feeding the type in the storage member.

116. The combination of a rotary storage drum, a stepped heart-shaped member on the end thereof, a pendulum at the end of the drum having a shoulder adapted to engage any of the steps of said member, means for rotating the drum until stopped by engagement of a step with the shoulder of the pendulum, said engagement giving the pendulum a limited movement, and type feeding mechanism actuated by such movement.

117. The combination of a storage member adapted to be turned on an axis, a stepped spiral carried thereby, a movable stop member, mechanism for positioning the stop member to engage with one of the steps of the spiral, and mechanism for feeding the type in the storage member, said mechanism being controlled by said stop member.

118. The combination of a rotary storage drum, a stepped member carried thereby, means adapted to engage any of the steps of said member, said engagement giving said means a limited movement, driving mechanism, an eccentric normally loose, a clutch which the movement of said means is adapted to actuate to connect the eccentric with the driving mechanism, an eccentric strap mounted on the eccentric, and type feeding mechanism operated by said eccentric strap.

119. The combination of a storage member adapted to be turned on an axis in either direction, a double stepped spiral carried thereby, and a movable stop member adapted to be positioned to engage with one of the steps of the spiral in either direction of movement of the storage member.

120. The combination of a rotary type storage drum, a stepped spiral carried thereby at one end, means adapted to engage said spiral, and a type transfer operated by such engagement.

121. The combination of a movable storage member, a member carried thereby and stepped in two directions, a movable stop member, mechanism for driving the storage member, and key actuated mechanism for positioning the stop member to engage with one of the steps of the stepped member according to the key actuated.

122. The combination of a rotatable storage drum adapted to be turned in either direction, a heart-shaped stepped member on one end thereof, a movable member having a shoulder adapted to be engaged by one of such steps according to the position of the member, and a key board having finger keys corresponding to the different characters of type, said keys operating to position said member.

123. The combination of a rotary drum, type-carrying members therein, each adapted to hold a row of type, a stepped spiral carried by the drum, means adapted to engage the steps, and type-feeding mechanism actuated by such engagement and adapted to feed a row of type on the drum.

124. The combination of a rotatable storage drum movable as a unit and adapted to hold a font of individual type removable therefrom, means tending to return it to a single position to rest when displaced therefrom but allowing it to turn in either direction, and mechanism for turning the drum in one direction or the other as desired.

125. The combination of a movable storage member formed to removably hold individual type, means tending to center it but allowing it to move in either direction, finger keys, and mechanism controlled thereby for moving said member in one direction or the other as desired.

126. The combination of a movable type carrying member, a pair of friction wheels, mechanism for rotating them in opposite directions, and mechanism for bringing either wheel into engagement with a part movable with the type carrying member.

127. The combination of a rotary type storage member having a smooth peripheral bearing surface, a friction wheel mounted adjacent thereto, means for rotating it, and mechanism for moving said wheel into engagement with said peripheral surface.

128. The combination of a movable type storage member provided with channels for holding rows of individually movable type, frictional driving mechanism adapted to move it, a positive stopping mechanism for the member, automatic mechanism for feeding the row of type in the selected channel, and key actuated mechanism for controlling the driving and stopping mechanisms.

129. The combination of a movable type storage member provided with channels for holding rows of individually movable type respectively, a friction drive for moving it, and positive mechanism for stopping it, and automatic means for feeding a row of type in a channel selected by such stoppage.

130. The combination of a movable storage member, a friction drive adapted to move it in either direction, and keys for controlling the application of the drive.

131. The combination of a rotary storage member having a smooth peripheral bearing surface, a continuously rotating friction wheel, mechanism for moving said wheel into engagement with said peripheral surface, and mechanism operated by the key board for stopping the rotation of the storage member.

132. The combination of a rotary type storage member, frictional driving mechanism adapted to rotate it in one direction or the other, key actuated mechanism for controlling such frictional drive, and key controlled mechanism for stopping said drum at the desired point.

133. The combination in a unitary machine, of a rotary printing drum, a type storage drum, said drums being mounted end to end, mechanism mounted independently of the storage drum for rotating it, and finger keys for controlling such mechanism.

134. The combination of a type storage drum formed to removably hold individual type, and mechanism for positioning the storage drum mounted below and in front of the drum and including a key board having finger keys for controlling such mechanism.

135. The combination of a storage drum and a printing drum mounted end to end, a platen coacting with the printing drum, key board mechanism for positioning the storage drum mounted below and in front of the storage drum, paper feeding mechanism mounted below and in front of the printing drum and adapted to feed paper to the printing drum and platen, and transfer mechanism for conveying type from either drum to the other.

136. The combination of printing mechanism, mechanism for assembling individual type on a portion of the printing mechanism, power mechanism adapted to drive either the assemblage mechanism or the printing mechanism, a clutch for determining which is driven, and a key board having characters corresponding to the different characters of type and adapted to control the assemblage mechanism.

137. The combination of a movable storage member having a set of type holders rigid with each other and each adapted to hold a row of individual type, mechanism for moving said member in either direction, and a set of finger keys corresponding to the different characters in the holders and adapted to control the movements of said member.

138. The combination of a movable type storage member having a plurality of parallel type-holding channels, a set of finger keys corresponding to the different characters in said channels and adapted to control such movement, and power mechanism adapted to actually effect such movement in either direction.

139. The combination of a key board with keys corresponding to various characters, mechanism controlled by the same key board for moving type in either of two directions, and mechanism adapted to be set to determine the direction.

140. The combination with a printing couple comprising a platen and a member adapted to hold a plurality of parallel lines of type, of a type-storage member, mechanism for transferring type one at a time between said storage member and said member of the couple, and a keyboard adapted to control the transfer and having keys corresponding to the various characters of the type.

141. The combination of a printing member adapted to turn on an axis and adapted to carry lines of individual type concentrically about said axis, a key board with keys corresponding to the various letter and number characters of a font of type, and mechanism controlled by the key board for assembling such type on said member.

142. The combination of a printing member adapted to turn on an axis and hold type concentrically about the same, a type channel leading thereto, and power-operated and key-controlled mechanism for transferring type between such member and channel.

143. The combination of a rotary printing drum adapted to carry type, a coöperating roller platen, an inking ribbon mounted on the drum, a key board with keys corresponding to the various characters of such type, and mechanism controlled by the key board for distributing type from the drum.

144. The combination of a printing mechanism comprising a type carrying member, a roller platen and an interposed fabric, of mechanism for assembling individual type on said member, and power mechanism adapted to cause the operation of the printing mechanism or of the assemblage mechanism, as desired.

145. The combination with a printing mechanism comprising a type carrying member, a roller platen rotating in contact therewith during printing and an interposed inking fabric, of power-operated and key-controlled mechanism for assembling individual type on said member.

146. The combination, with a type carrying member and a coöperating roller platen, of a key board with keys corresponding to various characters, and mechanism controlled by the key board for distributing type from said member.

147. The combination with a rotary printing drum, and a coöperating roller platen, of power-operated mechanism for assembling individual type on such drum, and a key board having keys corresponding to the various characters for controlling such mechanism.

148. The combination of a type-holding member, a roller platen having a rolling contact therewith during printing impression, a key board with keys corresponding to various characters, and mechanism controlled by the key board for assembling individual type on said member.

149. In a machine for setting and distributing type, the combination, with a movable type magazine, grooved mechanisms arranged to deliver to and receive type from said magazine, a plurality of key levers, and means actuated by depression of any one of said levers for adjusting said magazine in line with said grooves of said mechanism.

150. The combination with a member adapted to carry type in rows, of a set of keys corresponding to the different characters and mechanism controlled thereby and adapted to move said member the proper amount to bring a corresponding type-row into alinement with a relatively fixed discharge point, and means for discharging type from said row.

151. The combination of a member adapted to carry type in rows, means normally positioning said member, a set of keys corresponding to the different characters and mechanism controlled thereby and adapted to move said member the proper amount from its normal position to bring a corresponding type-row into alinement with a relatively fixed discharge point, and means for discharging type from said row.

152. The combination with two members adapted to carry type in rows, of a set of keys corresponding to the different characters and mechanism controlled thereby and adapted to move one of said members the proper amount to bring a corresponding type-row thereon into alinement with a predetermined type row on the other of said members.

153. The combination with two members adapted to carry type in rows, one of said members being a type supply member and the other a printing member, of a set of keys corresponding to the different characters and mechanism controlled thereby and adapted to move said supply member the proper amount to bring a corresponding type-row thereon into alinement with a predetermined type-row on said printing member.

154. The combination of two members adapted to carry type in rows, one of said members being a type supply member and the other a printing member, means normally positioning said supply member, and a set of keys corresponding to the different characters and mechanism controlled thereby and adapted to move said supply member from its normal position to bring a selected type-row thereon into alinement with a relatively fixed discharge point, said printing member being adjustable to bring successive type-rows thereon into alinement with such point.

155. The combination of a member adapted to carry type in rows, means adapted to discharge type from any one of said rows when properly positioned with reference thereto, and a set of keys corresponding to the different characters and mechanism controlled thereby and adapted to move said member to thus position a selected type-row and thereupon to actuate said type-discharge means.

156. The combination of a member adapted to carry type in rows, means normally positioning said member, means adapted to discharge type from any one of said rows when properly positioned with reference thereto, and a set of keys corresponding to the different characters and mechanism controlled thereby and adapted to move said member from its normal position to thus position a selected type-row and thereupon to actuate said type-discharge means.

157. The combination of two members adapted to carry type in rows, means adapted to transfer type from a type-row on one member to an alined type-row on the other when said rows are properly positioned with reference thereto, one of said members being adjustable to bring successive type-rows thus into position, and a set of keys corresponding to the different characters and mechanism controlled thereby and adapted to move said other member to bring a selected type-row thereon into alinement with the type-row on said first member thus positioned and thereupon to actuate said transfer means.

158. The combination of two members adapted to carry type in rows, one of said members being a type-supply member and the other a printing member, means normally positioning said supply member, means adapted to transfer type from a type-row on said supply member to a type-row on said printing member when said rows are alined and properly positioned with reference thereto, said printing member being adjustable to bring successive type-rows thus into position, and a set of keys corresponding to the different characters and mechanism controlled thereby and adapted to move said supply member from its normal position to bring a selected type-row thereon into alinement with the type-row on said printing member thus positioned and thereupon to actuate said transfer means.

159. The combination with a drum provided with longitudinal ways adapted to carry rows of type, of a set of keys corresponding to the different characters and mechanism controlled thereby and adapted to rotate said drum the proper amount to bring a corresponding way into alinement with relatively fixed discharge point.

160. The combination of a drum provided with longitudinal ways adapted to carry rows of type, means normally positioning said drum about its axis, and a set of keys corresponding to the different characters and mechanism controlled thereby and adapted to rotate said drum from its normal position the proper amount to bring a corresponding way into alinement with a relatively fixed discharge point.

161. The combination of a drum provided with longitudinal ways adapted to carry rows of type, means normally positioning said drum about its axis, and a set of keys corresponding to the different characters and mechanism controlled thereby and adapted to rotate said drum from its normal position to bring a selected way into alinement with a relatively fixed discharge point, certain of the keys of said mechanism being connected to rotate said drum in one direction, and others to rotate it in the opposite direction, from such normal position.

162. The combination of a drum provided with longitudinal ways adapted to carry rows of type, means normally positioning said drum about its axis, and a set of keys corresponding to the different characters and mechanism controlled thereby and adapted to rotate said drum from its normal position to bring a selected way into alinement with a relatively fixed discharge point, one set of the keys of said mechanism being respectively connected to rotate said drum through successively increasing arcs up to an arc of one-hundred and eighty degrees in one direction, and another set to similarly rotate it in the opposite direction, from such normal position.

163. The combination with two axially alined drums respectively provided with ways adapted to carry rows of type, of a set of keys corresponding to the different characters and mechanism controlled thereby and adapted to rotate one of said drums to bring a selected way thereon into alinement with a predetermined way on the other drum.

164. The combination with two axially alined drums respectively provided with ways adapted to carry rows of type, one of said drums being a type supply drum and the other a printing drum. of a set of keys corresponding to the different characters and mechanism controlled thereby and adapted to rotate said supply drum to bring a selected way thereon into alinement with a predetermined way on said printing drum.

165. The combination of two axially alined drums respectively provided with ways adapted to carry rows of type, one of said drums being a type supply drum and the other a printing drum, a set of keys corresponding to the different characters and mechanism controlled thereby and adapted to rotate said supply drum to bring a selected way thereon into alinement with a predetermined way on said printing drum, means normally positioning said supply drum about its axis, said key-controlled mechanism being adapted to move said supply drum from its normal position to bring a selected type-row thereon into alinement with a relatively fixed discharge point, said printing drum being rotatable about its axis to bring successive ways thereon into alinement with such point.

166. The combination of a drum provided with longitudinal ways adapted to carry rows of type, means adjacent to said drum adapted to discharge type from any one of said ways when positioned therebeneath, and a set of keys corresponding to the different characters and mechanism controlled thereby and adapted to rotate said drum to thus position a selected way and thereupon to actuate said type-discharge means.

167. The combination of a drum provided with longitudinal ways adapted to carry rows of type, means normally positioning said drum, means adjacent to said drum adapted to discharge type from any one of said ways when positioned therebeneath, and a set of keys corresponding to the different characters and mechanism controlled thereby and adapted to rotate said drum from its normal position to thus position a selected type-row and thereupon to actuate said type discharge means.

168. The combination of two axially alined drums respectively provided with longitudinal ways adapted to carry rows of type, means adjacent to said drums adapted to transfer type from a way on one drum to an alined way on the other when said ways are positioned therebeneath, one of said drums being rotatable to bring successive ways thereon thus into position, and a set of keys corresponding to the different characters and mechanism controlled thereby and adapted to rotate said other drum to bring a selected way thereon into alinement with the way on said first drum thus positioned and thereupon to actuate said transfer means.

169. The combination of two axially alined drums respectively provided with longitudinal ways adapted to carry rows of type, one of said drums being a type supply drum and the other a printing drum, means normally positioning said supply drum about its axis, means adjacent to said drums adapted to transfer type from a way on said supply drum to an alined way on the other when said ways are positioned therebeneath, said printing drum being rotatable to bring successive ways thereon thus into position, and a set of keys corresponding to the different characters and mechanism controlled thereby and adapted to rotate said supply drum from its normal position to bring a selected way thereon into alinement with the way on said printing drum and thereupon to actuate said transfer means.

170. The combination of two members adapted to carry type in rows; means adapted to transfer type from a type-row on one member to an alined type-row on the other, and vice versa, when said rows are properly positioned with reference to said means, one of said members being adjustable to bring successive type-rows thus into position; a set of keys corresponding to the different characters and mechanism controlled thereby and adapted to move said other member to bring a selected type-row thereon into alinement with the type row on said first member thus positioned; and means connecting said mechanism with said transfer means and adapted thereupon to optionally actuate the latter in either direction.

171. The combination of two members adapted to carry type in rows, one of said members being a type-supply member and the other a printing member; means normally positioning said supply member; means adapted to transfer type from a type-row on said supply member to an alined type-row on said printing member, and vice versa, when said rows are properly positioned with reference to said means, said printing member being adjustable to bring successive type-rows thereon thus into position; a set of keys corresponding to the different characters and mechanism controlled thereby and adapted to move said supply member from its normal position to bring a selected type-row thereon into alinement with the type-row on said printing member thus positioned; and means connecting said mechanism with said transfer means and adapted thereupon to optionally actuate the latter in either direction.

172. The combination of two axially alined drums respectively provided with longitudinal ways adapted to carry rows of type; means adjacent to said drums adapted to transfer type from a way on one drum to an alined way on the other, and vice versa, when said ways are positioned beneath said means, one of said drums being rotatable to bring successive ways thus into position; a set of keys corresponding to the different characters and mechanism controlled thereby and adapted to rotate said other drum to bring a selected way thereon into alinement with the way on said first drum thus positioned; and means connecting said mechanism with said transfer means and adapted thereupon to optionally actuate the latter in either direction.

173. The combination of two axially alined drums respectively provided with longitudinal ways adapted to carry rows of type, one of said drums being a type supply drum and the other a printing drum; means normally positioning said supply drum about its axis; means adjacent to said drums adapted to transfer type from a way on said supply drum to an alined way on the other, and vice versa, when said ways are positioned beneath said means, said printing drum being rotatable to bring successive ways thereon thus into position; a set of keys corresponding to the different characters and mechanism controlled thereby and adapted to rotate said supply drum from its normal position to bring a selected way thereon into alinement with the way on said printing drum thus positioned; and means connecting said mechanism with said transfer means and adapted thereupon to optionally actuate the latter in either direction.

174. In mechanism of the class described, the combination of a member adapted to carry type in rows; a set of keys corresponding to the different characters and mechanism controlled thereby and adapted to move said member to bring a selected type-row into alinement with a relatively fixed discharge point; and a clutch adapted to control the connection of said mechanism with said member.

175. In mechanism of the class described, the combination of a member adapted to carry type in rows; a set of keys corresponding to the different characters and mechanism controlled thereby and adapted to move said member to bring a selected type-row into alinement with a relatively fixed discharge point; and a clutch adapted to control the connection of said mechanism with said member, said mechanism including a universal bar adapted to actuate said clutch to break such connection.

176. In mechanism of the class described, the combination of a member adapted to carry type in rows; a set of keys corresponding to the different characters and mechanism controlled thereby and adapted to move said member the proper amount to bring a corresponding type-row into alinement with a relatively fixed discharge point; and a centering device adapted to hold said member against movement when a type-row is thus positioned.

177. In mechanism of the class described, the combination of a member adapted to carry type in rows; a set of keys corresponding to the different characters and mechanism controlled thereby and adapted to move said member to bring a selected type-row into alinement with a relatively fixed discharge point; and a centering device adapted to hold said member against movement when a type-row is thus positioned, said mechanism including a universal bar adapted to control the actuation of said centering device.

178. In mechanism of the class described, the combination of a member adapted to carry type in rows; a set of keys corresponding to the different characters and mechanism controlled thereby and adapted to move said member to bring a selected type-row into alinement with a relatively fixed discharge point; a clutch adapted to control the connection of said mechanism with said member; and a centering device adapted to hold said member against movement when a type-row is thus positioned, said mechanism including a universal bar adapted to actuate said clutch to break such connection and thereupon to render said centering device effective.

179. In mechanism of the class described, the combination of a member adapted to carry type in rows; means normally positioning said member; a set of keys corresponding to the different characters and mechanism controlled thereby and adapted to move said member from its normal position to bring a selected type-row into alinement with a relatively fixed discharge point; and a clutch, normally operative, adapted to control the connection of said mechanism with said member.

180. In mechanism of the class described, the combination of a member adapted to carry type in rows; means normally positioning said member; a set of keys corresponding to the different characters and mechanism controlled thereby and adapted to move said member from its normal position to bring a selected type-row into alinement with a relatively fixed discharge point; and a clutch, normally operative, adapted to control the connection of said mechanism with said member, said mechanism including a universal bar adapted to render said clutch inoperative when a type-row is thus positioned.

181. In mechanism of the class described, the combination of a member adapted to carry type in rows; means normally positioning said member; mechanism including a series of key levers and means controlled thereby and adapted to move said member from its normal position to bring a corresponding type-row into alinement with a relatively fixed discharge point; a clutch, normally operative, adapted to control the connection of said key levers with said member, said mechanism further including a universal bar adapted to render said clutch inoperative when a type-row is thus positioned.

182. In mechanism of the class described, the combination of a member adapted to carry type in rows; means normally positioning said member; mechanism including a series of key levers and means controlled thereby and adapted to move said member from its normal position to bring any one of a plurality of type-rows into alinement with a relatively fixed discharge point; and means controlling the selection of the particular type-row.

183. In mechanism of the class described, the combination of a member adapted to carry type in rows; means normally positioning said member; mechanism including a series of key levers and means controlled thereby and adapted to move said member from its normal position to bring any one of a plurality of type-rows into alinement with a relatively fixed discharge point; a clutch, normally operative, adapted to control the connection of said key levers with said member, said mechanism further including a universal bar adapted to render said clutch inoperative; and adjustable means controlling the actuation of said universal bar and thereby the selection of the particular type-row.

184. In mechanism of the class described, the combination of a member adapted to carry type in rows; means normally positioning said member; mechanism including a series of key levers and means controlled thereby and adapted to move said member from its normal position to bring any one of a plurality of type-rows into alinement with a relatively fixed discharge point; a clutch, normally operative, adapted to control the connection of said key levers with said member; a centering device adapted to hold said member against movement when a type-row is thus positioned, said mechanism further including a universal bar adapted to render the clutch inoperative and said centering device thereupon effective; and adjustable means controlling the actuation of said universal bar and thereby the selection of the particular type-row.

185. In mechanism of the class described, the combination of a drum provided with longitudinal ways adapted to carry rows of type; means normally positioning said drum; a set of keys corresponding to the different characters and mechanism controlled thereby and adapted to move said drum from its normal position to bring a selected way into alinement with a relatively fixed discharge point; and a clutch adapted to control the connection of said mechanism with said drum.

186. In mechanism of the class described, the combination of a drum provided with longitudinal ways adapted to carry rows of type; means normally positioning said drum; a set of keys corresponding to the different characters and mechanism controlled thereby and adapted to move said drum from its normal position to bring a selected way into alinement with a relatively fixed discharge point; and a clutch, normally operative, adapted to control the connection of said mechanism with said drum, said mechanism including a universal bar adapted to render said clutch inoperative when said way is thus positioned.

187. In mechanism of the class described, the combination of a drum provided with longitudinal ways adapted to carry rows of type; means normally positioning said drum; mechanism including a series of keys and means controlled thereby and adapted to move said drum from its normal position to bring any one of a plurality of ways into alinement with a relatively fixed discharge point; and means controlling the selection of the particular way.

188. In mechanism of the class described, the combination of a member adapted to carry type in rows; means normally positioning said member, a plurality of levers and mechanism controlled thereby adapted to bring a selected type carrying row into alinement with a relatively fixed discharge point; a plurality of keys adapted upon action to operate said levers; and means for discharging type from said selected row.

189. The combination of a type-case adapted to hold type assorted as to characters, means adapted to discharge any desired type from said case when properly positioned with reference thereto, and a set of keys corresponding to the different characters and mechanism controlled thereby and adapted to move said type-case to thus position selected type and thereupon to actuate said discharge means.

190. The combination of a type-case adapted to hold type assorted as to characters, means normally positioning said type-case, means adapted to discharge any desired type from said case when properly positioned with reference thereto, and a set of keys corresponding to the different characters and mechanism controlled thereby and adapted to move said type-case from its normal position to thus position selected type and thereupon to actuate said discharge means.

191. In a machine for setting and distributing type the combination with a rotatable magazine provided with a plurality of type holding grooved elements, a member arranged to deliver to and receive type from the elements of said magazine, a plurality of key levers, and means actuated by movement of any one of said levers for rotating said magazine to bring selected elements thereof into line with said member.

192. In a machine for setting and distributing type the combination with a movable magazine provided with a plurality of type holding grooved elements, means arranged to deliver and receive type to and from said elements, devices controlling entrance to and delivery from said magazine elements, a plurality of key levers, mechanism operated upon movement of any one of said levers for bringing a selected magazine element into line with said means, and devices operated upon movement of any one of said key levers for actuating said devices.

193. In a machine for setting and distributing type the combination with a rotatable magazine provided with a plurality of type holding grooved elements, means arranged to deliver and receive type to and from said magazine elements, devices controlling entrance to and delivery from said magazine elements, a plurality of key levers, mechanism operated upon movement of any one of said key levers for bringing a selected magazine element into line with said means, mechanism operated upon movement of any one of said key levers for actuating said devices, and a switch mechanism for determining whether the feed is to or from said magazine.

194. In a machine for setting and distributing type, in combination with a rotatable magazine, a plurality of keys, means adapted to move the magazine to a setting and distributing position, and key operated mechanism for connecting and disconnecting said means with and from said magazine, substantially as described.

In testimony whereof, I hereunto affix my signature in the presence of two witnesses.

HARRY C. GAMMETER.

Witnesses:
J. A. SUMMERLIN,
E. C. GAMMETER.

---

Copies of this patent may be obtained for five cents each, by addressing the "Commissioner of Patents, Washington, D. C."